United States Patent

Nishida

[11] Patent Number: 5,586,374
[45] Date of Patent: Dec. 24, 1996

[54] CLASP MECHANISM

[76] Inventor: Shoichi Nishida, No. 3-2, Nishi-Ichinoe, 4-Chome, Edogawa-Ku, Tokyo, Japan

[21] Appl. No.: 356,919

[22] Filed: Dec. 14, 1994

[51] Int. Cl.$^6$ .............. A45F 5/02; F16B 45/02; A44B 13/02
[52] U.S. Cl. ............ 24/599.8; 63/1.1; 24/599.4
[58] Field of Search .............. 24/601.5, 599.4, 24/599.5, 599.6–599.8; 294/82.19; 63/1.1, 2

[56] References Cited

U.S. PATENT DOCUMENTS

| | | | |
|---|---|---|---|
| 30,084 | 9/1860 | North | 24/601.5 |
| 140,531 | 7/1873 | North . | |
| 161,843 | 4/1875 | Vaughan . | |
| 172,352 | 1/1876 | Sparks | 24/599.8 |
| 217,194 | 7/1879 | Bednar | 24/601.5 X |
| 353,889 | 12/1886 | Smith . | |
| 359,408 | 3/1887 | Sperry | 24/601.5 |
| 394,598 | 12/1888 | McClintock . | |
| 559,640 | 5/1896 | Walker . | |
| 615,345 | 11/1897 | Cummings . | |
| 617,081 | 8/1897 | Conger . | |
| 961,221 | 6/1910 | Ewer | 24/601.5 |
| 2,166,666 | 7/1939 | Rolan | 24/601.5 |
| 2,333,488 | 9/1942 | Parth . | |
| 3,956,804 | 5/1976 | Gatof et al. | 24/599.8 X |
| 4,319,384 | 3/1982 | Horne | 24/3 R |
| 5,117,539 | 6/1992 | Shrader et al. | 24/599.8 |
| 5,414,909 | 5/1995 | Kielty | 24/97 |

FOREIGN PATENT DOCUMENTS

| | | | |
|---|---|---|---|
| 521468 | 3/1955 | Italy | 294/82.19 |
| 4-3016 | 1/1992 | Japan . | |
| 181988 | 6/1922 | United Kingdom | 24/601.5 |
| 1451049 | 9/1976 | United Kingdom | 24/601.5 |

*Primary Examiner*—Peter M. Cuomo
*Assistant Examiner*—Robert J. Sandy

[57] ABSTRACT

A base portion 122 in a hook 12 having an arc-shaped portion 121 is pivotally secured to a main body 11 by a pivot pin 15. A tip end 124 of the arc-shaped portion 121 projected outward from the main body 11 is mated with and disengaged from a mating end 13 of the main body 11. The hook 12 is urged by means of a spring 14 so that the tip end 124 is naturally mated with the mating end 13. For the attachment, the main body 11 is pinched with fingers of one hand, while the arc-shaped portion 121 is pivoted against the bias action of the spring 14 with the same hand so that the tip end 124 is separated from the mating end 13. Then, the arc-shaped portion 121 latches, from its tip end 124, the chain's end 21 pinched with the other hand. For the detachment, the end 21 is pulled so that the tip end 124 is moved outward with respect to the center of the arc-shaped area surrounded by the hook 12. Further, the end of the chain 41 is pulled so as to reach the tip end 124, thereby the end of the chain 41 is detached.

10 Claims, 4 Drawing Sheets

1

CLASP MECHANISM

BACKGROUND OF THE INVENTION

1. Field of the Invention

This invention relates to a clasp mechanism, and more specifically to a clasp mechanism which can be opened and closed and used for interconnecting two ends of a chain such as a necklace, bracelet, key holder and the like or for connecting the one end of the chain to another article.

2. Description of the Prior Art

Conventional clasps or snap-hooks of this type are disclosed in Japanese Utility Model KOKAI No. 4-3016, U.S. Pat. Nos. 4,319,384, 3,956,804 and 5,117,539 and the like. For example, as shown in FIG. 4, in a clasp or snap-hook 50, a main body 54 has a ring 52 in one unit so that one end of a jewelry chain 41 such as a necklace and the like is connected to the ring. Alternatively, a jewelry piece 40 can be directly connected to the ring 52. A curved hook 53 is provided to latch and unlatch an end-ring 41'. In some cases, this end-ring 41' is formed by the chain's other end itself, which is opposite to the one end connected to the ring 52. In other cases, the end-ring 41' may be connected to the jewelry piece 40 directly or to the other end of the chain 41. An arm 55 having a mating end 57 at its fore end is pivotally connected to the above main body 54 by means of a shaft 56.

A thumb piece 58 is formed at the back end of this arm 55 so as to be projected from the web of the main body 54. The arm 55 is constructed to be pivotable when the thumb piece 58 is pushed with a finger so that the mating end 57 of the arm 55 can be mated with the tip end of the hook 53. The arm 55 is urged by means of a spring 59 in the counterclockwise direction of FIG. 4; in the outer peripheral direction with respect to the center C of an arc-shaped area surrounded by the hook 53 so that the mating end 57 is naturally engaged to the tip end of the hook 53 in the closed condition.

The clasp of this type can be used for latching an optional article. For example, a chain has, at its one end, a clip and the like for gripping a belt loop and, at its other end, the above clasp latching the article such as a pocket bell, key holder and the like. In this case, the clasp may be used for latching the chain to an end ring, which is directly attached to the article or to the article's case. Further, the clasp may be used for connecting the chain to another end-ring which is attached to the above clip and the like.

When the necklace having the conventional clasp 50 is put on, the thumb piece 58 is pivoted against the biasing action of the spring 59 so that the mating end 57 of the arm 55 is disengaged and separated from the tip end of the hook 53 in the clockwise direction of FIG. 4; in the direction toward the center of the hook 53. Thus, an encirclement which has been formed with the mating end 57 and hook 53 is in turn opened. Then, the hook 53 is inserted, from its tip end, into the end-ring 41', which is usually provided at the chain's other end of the chain 41 of a jewelry piece 40 such as a necklace, thereby the end-ring 41' can be latched to the hook 53. Next, by releasing the finger from the thumb piece 58, the arm 55 is pivoted by the biasing action of the spring 59 in the counter-clockwise direction of FIG. 4; in the outer peripheral direction with respect to the center C of the arc-shaped area surrounded by the hook 53. This pivotal movement is stopped when the mating end 57 of the arm 55 is mated with the tip end of the hook 53 so that the arm is returned to the initial position in the closed condition. Thus, wearing of the necklace is finished.

Generally, the clasp 50 of the above chain 41 has a small size with the length of 10 to 15 mm and the thumb piece 58 of the arm 55 is quite small so as to project from the web of the main body 54 with the height of about 1.5 to 2.0 mm. Accordingly, in manipulation for attachment and detachment of the jewelry piece, it is impossible with one hand that the thumb piece 58 is pivoted while the main body 54 is pinched. Therefore, while both side surfaces of the main body is pinched with the finger-tips of one hand, the pivotal movement of the thumb piece 58 is effected by hooking a finger-nail of the other hand so that the mating end 57 of the arm 55 is disengaged and separated from the tip end of the hook 53 toward the center. While this condition is remained by maintaining the application of the force to the thumb piece 58 with the finger-nail of the other hand, the tip end of the hook 53 should be inserted into the end-ring 41', which is chain's one end of the jewelry piece 40 or provided at the other end of the chain or at the optional article. Accordingly, the manipulation for attachment and detachment of the jewelry piece is not only complicated but difficult.

In both cases of detachment and attachment, while the main body 54 is pinched with the finger-tips of one hand, the thumb piece 58 is hooked by the finger-nail of the other hand. However, since this operation should be performed under the condition that user's arms are put around user's neck, the manipulation for attachment and detachment of the jewelry piece is particularly complicated.

Further, it is not easy to pinch the main body 54 with the finger-tips of the one hand while the application of the force to the quite small thumb piece 58 is maintained with the finger-nail of the other hand. Precisely, since it is difficult to maintain the open condition that the mating end 57 of the arm 55 is disengaged and separated from the tip end of the hook 53, the manipulation for attachment and detachment of the jewelry piece should be tried many times.

SUMMARY OF THE INVENTION

The present invention has been developed for solving the above problems. The object of the present invention thereby is to provide a clasp mechanism which can be easily manipulated with one hand and facilitates the manipulation of attachment and detachment surely.

In order to attain this object, in a clasp 10 of the present invention, a hook 12 has a base portion 122 having an arc-shaped portion 121 bendably formed so as to latch and unlatch an end-ring 21, which is formed by the other end itself of a chain of a jewelry piece 40, which is connected to the other end of the chain, or which is connected to an optional article, the base portion 122 being pivotally secured to a main body 11 having a ring 17 connected to one end of a chain 41 and the like, at a position which is located at the main body's center on a line D—D formed between a center of the ring and a center line, that is the longest diameter, of the arc-shaped portion, or which is located in the hook's base portion-side with respect to the line D—D formed between a center of the ring and the center line.

Then, the arc-shaped portion 121 is projected outward from the main body's one side edge shown in the lower part of FIG. 1 so that the tip end 124 of the arc-shaped portion 121 is mated with the main body's other side edge shown in the upper part of FIG. 1. The tip end 124 of the arc-shaped portion 121 is formed to be pivotally moved so that the hook 12 is separated outward from the main body 11 while the base portion 122-side part of the arc-shaped portion 121 is approached to the above other side edge. Further, the hook 12 is pivotally moved by the bias action of a spring 14 so that the tip end 124 of the arc-shaped portion 121 can be naturally mated with the other side edge in the closed condition.

The upper edge of the web 111 of the main body 11 may be extended to reach the upper edge of the sides 112 of the main body so that a shoulder 123 formed at a back end of the arc-shaped portion of the hook or the side face of the arc-shaped portion is abutted against the upper edge of the web 111.

In order to stop the pivotal movement of the hook 12 on the direction of bias action of the spring 14, the tip end 124 of the arc-shaped portion 121 in the hook 12 can be formed so as to be abutted against and separated from the other side edge of the main body 11.

The mating end 13 may be formed to be projected from the other side edge of the main body 11, then the end face of the mating end 13 and the end face of the tip end 124 of the arc-shaped portion 121 in the hook 12 are formed so as to be oblique, thereby these end faces are mated each other.

By forming the mating end so as to be symmetric with the part of the base portion projected from the side of the main body, the outer configuration of the whole clasp shows symmetry, thereby requirements in appearance and function can be satisfied.

In the manipulation of the clasp 10, the main body 11 is pinched with a thumb and a middle finger of one hand. At the same time, with an index finger of the same hand, the tip end 124 of the arc-shaped portion 121 in the hook 12 is pivotally moved outward from the main body 11 against the bias action of the spring 14. Next, the arc-shaped portion 121 is inserted, from its tip end 124, through the end-ring 21 pinched with the other hand so that the end-ring 21 is latched to the hook 12. The end-ring formed by the other end itself of the chain 41 of the jewelry piece 40. Alternatively, the end-ring may be connected to the other end of the chain or to the optional article. Then, by releasing the index finger of the one hand from the hook 12, the tip end 124 of the arc-shaped portion 121 in the hook 12 is returned to its original position by the bias action of the spring 14. Although the clasp 10 is small, this manipulation is carried out easily.

By pulling the arc-shaped portion 121 at the position near the tip end 124 using this end-ring 21 of the chain 41 and the like, the tip end 124 of the arc-shaped portion 121 is disengaged from the mating end 13. Then, the end-ring 21 is disengaged from the tip end 124 of the hook 12. The manipulation for detachment of the chain 41 from the clasp 10 can be carried out further easily comparing the manipulation for attachment of the chain 41 to the clasp 10. Moreover when tension is applied to the clasp from one end or both ends of the chain, even if any force is applied to the main body in the direction where the hook should be opened, since the moment for opening the hook causes the force by which the hook's shoulder is pressed to the upper edge of the web, the hook is never opened.

In the above mentioned U.S. Pat. No. 4,319,384, it is sure that there may be a similarity as for the direction in which the trigger is opened. However, in this conventional example, since the pivot of the trigger is located at the same position as the eyelet, when the forces are applied to them so that they are pulled in directions reversed each other, the trigger is always opened by the force applied to the main body from the nose-side in the direction where the trigger should be opened (This conventional example is not used for a clasp for a jewelry piece and the like, so it has no problem to be solved in the above mentioned circumstances.)

BRIEF DESCRIPTION OF THE DRAWINGS

The object and advantages of the invention will become understood from the following detailed description of preferred embodiments thereof in connection with the accompanying drawings in which like numerals designate like elements, and in which.

DETAILED DESCRIPTION OF THE PREFERRED EMBODIMENTS

Figure 1:
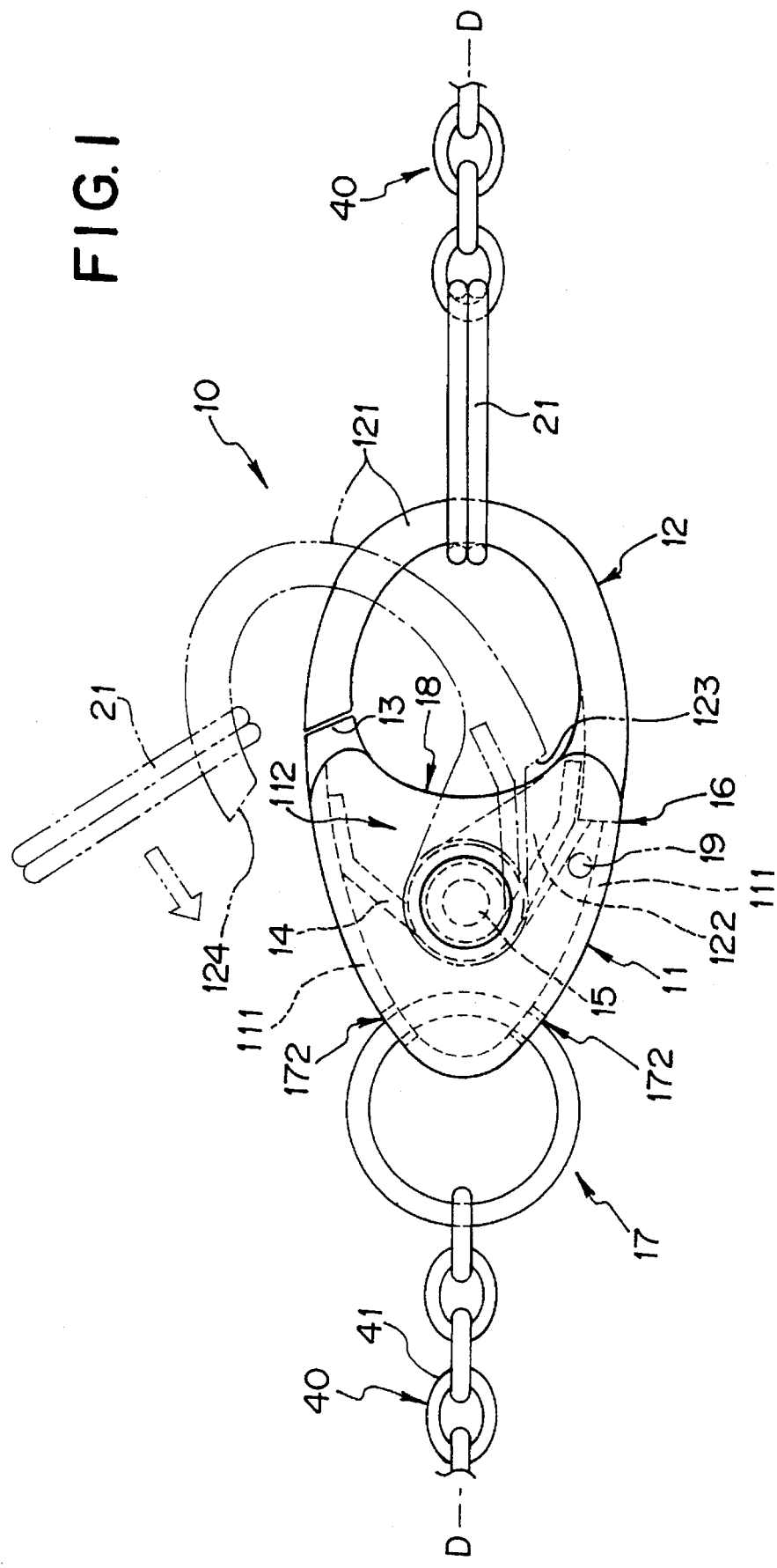
FIG. 1 is a plan view totally showing an embodiment of a clasp mechanism in the present invention.
Figure 2:
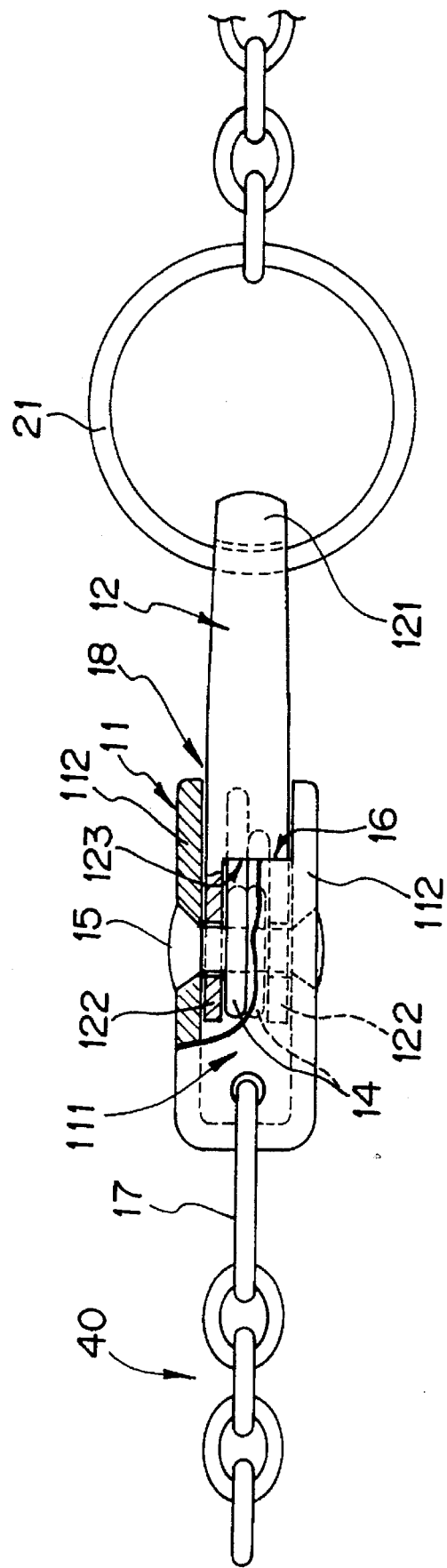
FIG. 2 is a side view showing a partial section of FIG. 1.

In FIG. 1 and 2, reference numeral 11 designates the main body. The main body is manufactured from a metal, preferably a noble metal such as pure gold, gold 14 and more carats fine, and comprised of somewhat heart-shaped sides 112, 112 and a web 111 by lost wax process, full mold process and the like.

Precisely, the main body 11 is constructed as a case comprising the sides 112, 112 which are opposed each other with a short distance and have the same substantially triangle-shape, the web 111 which is elongated between the both sides 112, 112 along their edges so as to form a bottom of the case, and an aperture 18 is formed so as to be the base of the above triangle-shape and narrow and long.

The web 111 has eyelets 172, 172 which are formed to be opposed each other at the side opposite to the aperture 18-side, in the reverse direction to the tip end 124 of the hook 12. Then, one end of the chain 41 and the like is connected to the ring 17 which is inserted into the eyelets 172, 172. The above one end of the chain 41 and the like is bendably molded from the chain 41 or a flattened noble metal. In some cases, the chain 41 may be used for a necklace, bracelet, key holder and the like. In other cases, the chain itself may be a jewelry piece 40 such as a metal-chain.

The ring 17 may be formed to have the shape of circle and the like in one unit with the main body 11 in the same way as the ring 52 in the above conventional clasp 50.

Figure 3A:
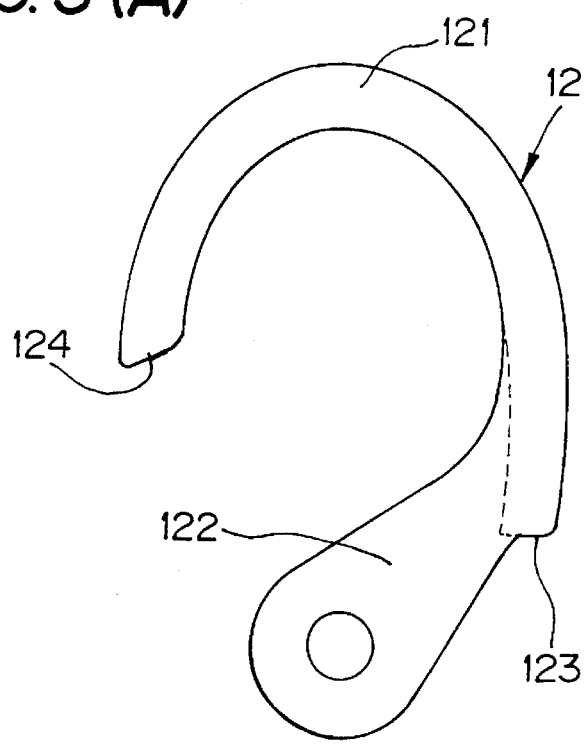
FIG. 3(A) is a front view of a hook.
Figure 3B:
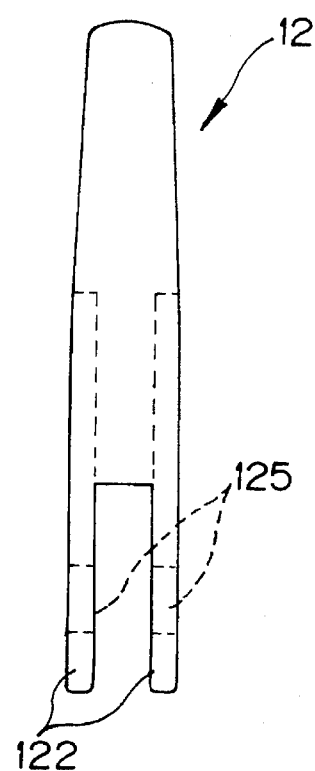
FIG. 3(B) is a right side view of the hook.
Figure 3C:
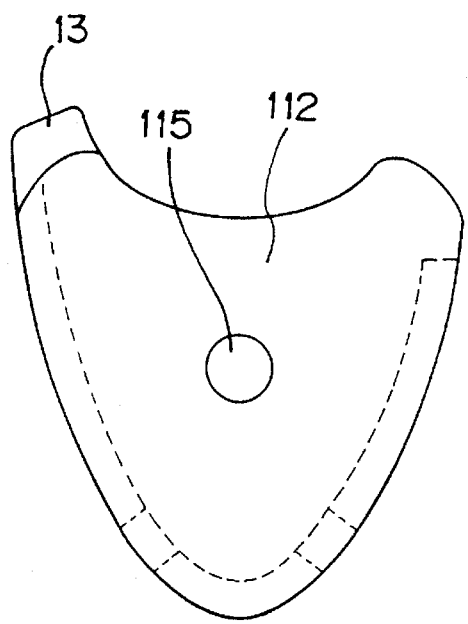
FIG. 3(C) is a front view of a main body.
Figure 3D:
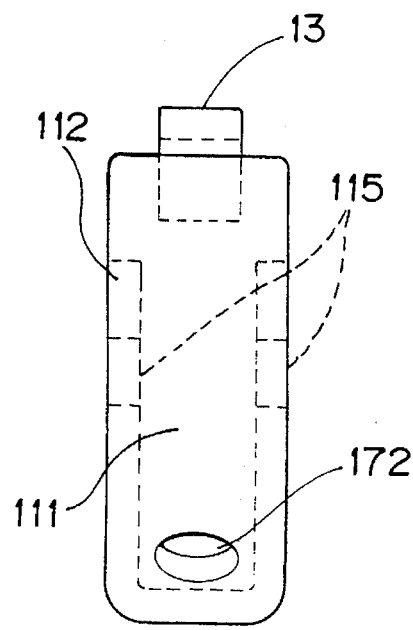
FIG. 3(D) is a right side view of the main body.

As shown in FIGS. 1 and 3(C), at the location opposite to the ring 17-side, the main body 11 has the mating end 13 formed on the end face of one end of the above aperture 18 in its longitudinal direction so as to be projected in one unit with the main body 11. This mating end 13 is formed, in closed condition, to be engaged to the tip end 124 of the arc-shaped portion 121 of the hook 12.

The hook 12 is comprised of the base portion 122 and the arc-shaped portion 121. As shown in FIG. 3(B), the base portion 122 has two plates which are opposed each other and inserted into the case of the above main body 11. As shown in FIG. 3(A), the arc-shaped portion 121 is bendably formed so as to be J-shaped or fish hook-shaped in one unit with the base portion 122. Then, the arc-shaped portion 121 can latch an end-ring 21, which is connected to the other end of the chain 41 of the above jewelry piece 41 or which is provided in the optional article.

The hook 12 may not has the base portion 122 but pivotally support the back end of the arc-shaped portion 121 of the hook 12. In the clasp 10, the base portion 122 of the hook 12 is inserted into the case of the main body 11 from its aperture 18. In this case, as shown in FIGS. 3(A) to 3(D), bores 125, 125 are provided on the base portion 122, while bores 115, 115 are provided on the sides 112, 112, for pivotally connecting the hook 12 using the pivot pin 15. Precisely, the bores 115, 115, 125, 125 are formed at the position which is located on the center of the main body 11 and on the line D—D in FIG. 1 formed between the center of the ring 17 and the center line, that is the longest diameter, of the arc-shaped portion 121, or which is located under the line D—D in FIG. 1 at the base portion 122-side, so that the base portion 122 of the hook 12 is pivotally supported by the pivot pin 15 inserted through these holes.

The arc-shaped portion 121 of the hook 12 is projected outward from the main body's one side edge; in the longitudinal direction of the aperture 18, one end thereof opposite to the above mating end 13. Then, the tip end 124 of the arc-shaped portion 121 is mated with the mating end 13 so as to form an encircled space with the curved inner edge of the arc-shaped portion 121 and the longitudinal edge of the aperture 18.

The hook 12 is formed so as to be pivotally moved on a locus, from the mating location of the tip end 124 of the arc-shaped portion 121 with the mating end 13, to a terminal location of the tip end 124 disengaged and separated from the mating end 13, as shown in alternate long and two short dashes lines in FIG. 1.

A coil spring 14 is provided between the two opposed sides of the base portion 122 in the hook 12 so as to externally surround the pivot pin 15. The tip end 124 of the arc-shaped portion 121 in the hook 12 is pivotally moved by the bias action so as to be naturally mated with the mating end 13 of the main body 11 so that the hook 12 is closed.

A shoulder 123 is formed at the edge between the arc-shaped portion 121 and the base portion 122 in the hook 12. Then, when the tip end 124 of the arc-shaped portion 121 is mated with the mating end 13, the shoulder 123 is abutted against the upper edge 16 of the web 111 in the main body 11 so that the scope of the pivotal movement of the hook 12 in the direction caused by the bias action of the spring 14 can be regulated. Precisely, the upper edge 16 of the web 111 regulates the pivotal movement of the tip end 124 of the arc-shaped portion 121 in the hook 12 so that the hook 12 is not pivotally moved, in the clockwise direction in FIG. 1, beyond the position reached when the tip end 124 is mated with the mating end 13.

As shown in FIG. 1, the above mating end 13 is located on the locus of the pivotal movement of the tip end 124 of the arc-shaped portion 121 in the hook 12 so that the end face of the tip end 124 of the arc-shaped portion 121 and the end face of the mating end 13 are obliquely formed so as to be abutted against each other. This abutting also regulates the pivotal movement of the hook 12 so that the hook 12 is not pivotally moved, in the clockwise direction in FIG. 1, beyond the position reached when the tip end 124 is mated with the mating end 13.

The upper edge 16 of the above web 111 may be formed so that the upper edge 16 reach the upper edge of the side 112 of the main body (right-side in FIG. 1) to be abutted against the shoulder 123 or the side face of the arc-shaped portion 121 in the hook 12.

Instead of the upper edge 16, a stopper 19 may be used. This stopper 19 is not engaged to the side edge of the base portion 122 in the hook 12 until the tip end 124 of the arc-shaped portion 121 in the above hook 12 is mated with the mating end 13 of the main body 11. As shown in FIG. 1, the stopper 19 is provided so as to insert through the sides 112, 112 of the main body 11, while the both ends of the stopper 19 are secured to the sides 112, 112 respectively. Alternatively, the stopper 19 may be formed on the internal side face of the either side. This stopper 19 has the same function as that of the web's upper edge 16 which is abutted against the side edge of the base portion in the above hook 12 or the above shoulder 123.

In FIGS. 1 and 3(A) to 3(D), the above mating end 13 is formed so as to be projected from the web 111 of the main body 11 at its one side. The reason of this is as follows. There are two requirements in configuration of the hook 12. One requirement is that the tip end 124 is preferably tapered as much as possible for sure manipulation. Another requirement is that the hook's arc-shaped portion 121 projected from the main body is desired to show symmetry so that its appearance is excel due to a beautiful curve. Since the base portion 122 of the hook 12 should be formed so as to have enlarged width comparing the arc-shaped portion 121 for its rugged construction, if the hook's tip end 124 were extended to the upper edge of the web 111 of the above main body 11 at the one side, without forming of the mating end 13, the tip end 124 should be formed like the base portion 122, which means that the above two requirements can not be satisfied. Therefore, the mating end 13 is formed in one unit with the main body 11 so that the mating end 13 and the part of the base portion 122 projected from the main body 11 are identical and symmetrical. As a result, as for the configuration of the whole of the hook 12, good balance is obtained in appearance design due to this symmetry.

When the jewelry piece 40 having the clasp 10 of the present invention at its one end is put on, or when the end-ring 21 connected to the optional article is latched to the clasp 10, the manipulation of attachment and detachment is, for example, carried out as follows. First, the sides 112, 112 of the main body 11 are pinched with a thumb and a middle finger of one hand. At the same time, the arc-shaped portion 121 of the hook 12 is pushed with an index finger of the same hand in the counter clockwise direction on FIG. 1; in the outer peripheral direction with respect to the center of the arc-shaped area surrounded with the hook 12. Thus, the tip end 124 of the arc-shaped portion 121 is disengaged and separated from the mating end 13 as shown in alternate long and two short dashes lines in FIG. 1. Next, while the end-ring 21 at one end of the chain 41 is pinched with fingers of the other hand, the arc-shaped portion 121 is inserted into the end-ring 21 from the tip end 124. Then, the index finger of the one hand pinching the clasp 10 is released from the arc-shaped portion 121, thereby, the hook 12 is pivotally moved with respect to the main body 11 by the bias action of the spring 14 in the clockwise direction in FIG. 1; in the direction toward the center of the hook 12. The pivotal movement of the hook 12 is stopped when the shoulder 123 is abutted against the upper edge 16 of the web 111, thereby the hook 12 is surely returned to the initial position where the tip end 124 of the arc-shaped portion 121 is mated with the mating end 13 of the main body 11. Thus, is finished Wearing of the jewelry piece 40; attachment of the chain 41 to the end-ring 21 of the optional article.

In the conventional clasp 50, after the manipulation for open condition is carried out with both hands, the clasp 50 is pinched again by one hand so that the end-ring 41' is inserted with the other hand. Since the clasp 50 is quite small, the operation is very complicated. However, although the clasp 10 of the present invention is also quite small, the pivotal movement of the hook 12 can be performed with one hand, hence the manipulation for the clasp 10 is very easy.

The jewelry piece 40, which has been put on, can be detached in much easily comparing the manipulation for attachment. Precisely, while the two plates of the main body 11 are pinched with one hand, the arc-shaped portion 121 is pulled at the position near the tip end 124 using the end-ring 21 at the one end of the chain 41 of the jewelry piece 40 so that the hook 12 is pivotally moved against the bias action of the spring 14 in the counter clockwise direction in FIG. 1; in the outer peripheral direction with respect to the center of the arc-shaped area surrounded with the hook 12. Thus, the tip end 124 of the arc-shaped portion 121 is disengaged and separated from the mating end 13 of the main body 11. Then, the end-ring 21 is moved along the arc-shaped portion 121 to its tip end 124. Thus, the end-ring 21 is easily and surely detached from the tip end 124 of the arc-shaped portion 121.

The base portion 122 of the hook 12 may be pivotally supported by means of the pivot pin 15 inserted through the bores 151, 151 which are, in FIG. 2, located on the line formed between the center of the ring 17 and the center line, that is the longest diameter, of the arc-shaped portion 121, or which are located under the line, in the main body 11. In this case, if tension is applied to the hook 12 and ring 17 from the both ends of the chain 40, the end-ring 21 is moved to a position on the longest diameter, thereby, moment for opening the hook 12 causes a force by which the hook 12 is pivoted on the clockwise direction in FIG. 1 so that the shoulder 123 of the hook 12 is pressed to the upper edge 16 of the web 111.

Figure 4:
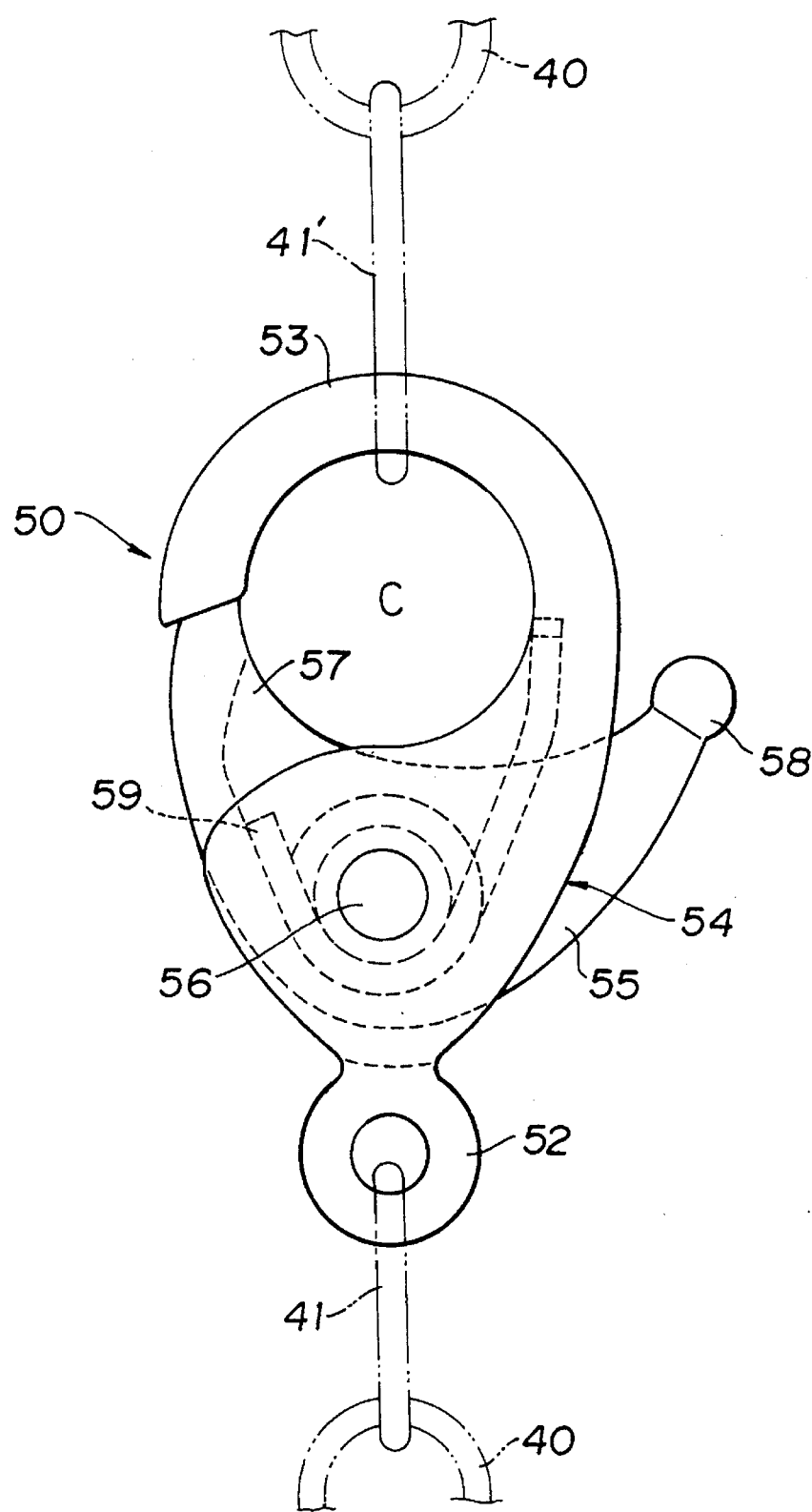
FIGS. 4 is a plan view totally showing an embodiment of a conventional clasp mechanism.

In the conventional clasp, the thumb piece 58, as shown in FIG. 4, is projected from the main body for the pivotal movement of the hook. However, in the present invention, since there is no provided such piece, the design improvement which is extremely required for the jewelry piece can be provided. In manipulation of the conventional clasp, wool yarns or fibers of clothes are possibly hooked to the arm resulting in damage of the clothes. Further, a user sometimes has a scratch due to the arm. However, in the present invention, since the hook 12 is pivotally moved in the way described above, such problems are not caused.

In the present invention, the operation for pivotal movement of the arc-shaped portion of the hook can be carried out with one hand easily. Accordingly, the end-ring provided in the other end of the chain or the optional article can be latched to the arc-shaped portion quite easily. Then, by only pulling the latched end-ring provided in the other end of the chain or the optional article in the direction where the tip end of the arc-shaped portion in the hook is pivotally moved against the bias action, the chain can be easily detached from the clasp. As a result, the manipulation for attachment and detachment of the chain is carried out easily by this clasp.

By the mating end projected from the above main body's other side edge so as to be mated with the end face of the tip end of the arc-shaped portion of the hook, the tip end of the hook can be surely mated with the mating end of the main body.

When the above tip end of the hook is mated with the mating end formed on the other side edge so as to be projected from the side of the main body, it is preferable that the mating end and the part of the base portion projected from the side of the main body are symmetric each other. In this case, the tip end of the hook can be tapered resulting in convenient in the manipulation, whole of the hook shows the beautiful curve in the appearance design due to symmetry, and sufficient strength is given to the base portion of the hook.

Further, when the tension is applied to the hook and/or ring from the one end or both ends of the chain, even if any force is applied to the main body 11 from the upper side to the lower side in FIG. 1, the hook is never opened. Because, the moment for opening the hook causes the force, by which the hook's shoulder or the hook's back end is pressed to the upper edge of the web.

Thus the broadest claims that follow are not directed to an article that is configure in a specific way. Instead, said claims are intended to protect the heart or essence of this invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without separating from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A clasp, comprising:

a) a main body;

b) a hook;

c) said main body having opposed sides defining a cavity therebetween, said body including a web disposed between said opposed sides;

d) said hook including an arc-shaped portion for securing to an article, said arc-shaped portion including a free and;

e) said hook including a base portion adapted to be disposed within said cavity and pivotably secured to said opposed sides for movement between closed and open positions, said base portion including opposed side walls;

f) a mating end secured to said main body and extending therefrom, said mating end being adapted to engage said free end of said arc-shaped portion when in the closed position;

g) a spring operably disposed within said main body cavity and between said base portion opposed side walls for biasing said arc-shaped portion in the closed position;

h) said web including an end portion; and i) said base portion including a shoulder adapted to engage said web end portion when said arc-shaped portion is in the closed position, thereby providing a stop.

2. A clasp as in claim 1, wherein:

said main body includes a web disposed between said opposed sides.

3. A clasp as in claim 1, wherein:

a) said free end of said arc-shaped portion and said mating end are complementarily tapered.

4. A clasp as in claim 1, wherein:

a) said main body includes an eyelet for receiving a ring.

5. A clasp as in claim 2, wherein:

a) said web includes a pair of eyelets for receiving a ring.

6. A clasp, comprising:

a) a main body;

b) a hook;

c) said main body having opposed sides defining a cavity therebetween, said main body including peripheral side and top edges;

d) a web disposed between said opposed sides along said peripheral side edge, said web including an eyelet for receiving a ring;

e) said hook including an arc-shaped portion for securing to an article, said arc-shaped portion including a free end;

f) said hook including a base portion adapted to be disposed within said cavity and pivotably secured to said opposed sides for movement between closed and open positions;

g) a mating end secured to said main body and extending therefrom, said mating end being adapted to engage said free end of said arc-shaped portion when in the closed position; and h) a spring operably disposed within said main body cavity for biasing said arc-shaped portion in the closed position.

7. A clasp as in claim 6, wherein:

a) said base portion includes opposed side walls; and b) said spring is disposed between said base portion opposed side walls.

8. A clasp as in claim 7, wherein:

a) said main body and hook form an arcuate shape when said arc-shaped portion is in the closed position.

9. A clasp as in claim 8, wherein:

a) said main body is substantially heart-shaped.

10. A clasp, comprising:

a) a main body;

b) a hook;

c) said main body having opposed sides defining a cavity therebetween, said body including a web disposed between said opposed sides, said web including a pair of eyelets for receiving a ring;

d) said hook including an arc-shaped portion for securing to an article, said arc-shaped portion including a free end;

e) said hook including a base portion adapted to be disposed within said cavity and pivotably secured to said opposed sides for movement between closed and open positions, said base portion including opposed side walls;

f) a mating end secured to said main body and extending therefrom, said mating end being adapted to engage said free end of said arc-shaped portion when in the closed position; and g) a spring operably disposed within said main body cavity and between said base portion opposed side walls for biasing said arc-shaped portion in the closed position.

* * * * *